US008010355B2

(12) United States Patent
Rahbar

(10) Patent No.: US 8,010,355 B2
(45) Date of Patent: Aug. 30, 2011

(54) LOW COMPLEXITY NOISE REDUCTION METHOD

(75) Inventor: Kamran Rahbar, Ottawa (CA)

(73) Assignee: Zarlink Semiconductor Inc., Kanata, ON (CA)

( * ) Notice: Subject to any disclaimer, the term of this patent is extended or adjusted under 35 U.S.C. 154(b) by 1137 days.

(21) Appl. No.: 11/740,187

(22) Filed: Apr. 25, 2007

(65) Prior Publication Data

US 2007/0255560 A1 Nov. 1, 2007

(30) Foreign Application Priority Data

Apr. 26, 2006 (GB) .................................. 0608201.0

(51) Int. Cl.
*G10L 15/20* (2006.01)

(52) U.S. Cl. ......... 704/233; 704/227; 704/228; 704/265

(58) Field of Classification Search ........................ None
See application file for complete search history.

(56) References Cited

U.S. PATENT DOCUMENTS

| | | | | |
|---|---|---|---|---|
| 6,415,253 B1 * | 7/2002 | Johnson | ........................ | 704/210 |
| 6,591,234 B1 * | 7/2003 | Chandran et al. | ............. | 704/225 |
| 6,810,273 B1 * | 10/2004 | Mattila et al. | ................. | 455/570 |
| 7,366,294 B2 * | 4/2008 | Chandran et al. | ............. | 379/341 |
| 2004/0257156 A1 * | 12/2004 | Botti et al. | ................ | 330/124 R |
| 2005/0027520 A1 * | 2/2005 | Mattila et al. | ................. | 704/228 |
| 2005/0240401 A1 | 10/2005 | Ebenezer | | |
| 2005/0265562 A1 * | 12/2005 | Rui | ................................ | 381/92 |
| 2006/0165202 A1 * | 7/2006 | Thomas et al. | ............... | 375/368 |
| 2006/0184363 A1 * | 8/2006 | McCree et al. | ............... | 704/233 |

* cited by examiner

*Primary Examiner* — Leonard Saint Cyr
(74) *Attorney, Agent, or Firm* — Marks & Clerk; Richard J. Mitchell

(57) ABSTRACT

A method of reducing noise in a speech signal involves converting the speech signal to the frequency domain using a fast fourier transform (FFT), creating a subset of selected spectral subbands, determining the appropriate gain for each subband, and interpolating the gains to match the number of FFT points. The converted speech signal is then filtered using the interpolated gains as filter coefficients, and an inverse FFT performed on the processed signal to recover the time domain output signal.

6 Claims, 4 Drawing Sheets

LOW COMPLEXITY NOISE REDUCTION METHOD

FIELD OF INVENTION

The invention relates to the field of voice communication systems, and in particular to a method of noise reduction in such systems with noisy speech signals with medium to very low signal to noise ratios.

BACKGROUND OF THE INVENTION

In handsfree speech communication the speaker is usually located far from the microphone and since the speech intensity decreases with increasing distance to the microphone, even small background noise can have major impact on the perceived speech quality. In a car environment, the background noise is mainly due to the wind and road noise and can be at much higher level than the speech signal itself. The speech signals under this situation are hardly intelligible and a noise reduction function is essential to improve the speech intelligibility.

FIG. 1 shows a typical application of noise reduction algorithm. In this example the noise reduction is combined with an acoustic echo canceller to remove noise and echo from the near end talker's speech signal.

The most common approach for single channel noise reduction is based on frequency domain signal manipulation. FIG. 2 shows the general frame work for single channel frequency domain noise reduction. As can be seen from the figure the noisy speech signal first is converted to the frequency domain. The power of the input signal then is calculated at each individual frequency bin. Based on the calculated power, the power of the speech only and noise only signals are estimated. These two new estimated powers then are used to calculate the noise reduction filter coefficients. These frequency domain filter coefficients then are applied to the spectrum of the noisy speech signal. At final stage the outcome of the above spectrum filtering is transformed to the time domain to reproduce the clean speech signal.

Spectral subtraction noise reduction is a simple and well known method which follows the above scheme. J S. F. Boll: "Suppression of Acoustic Noise in Speech Using Spectral Subtraction", IEEE Trans. on Acous. Speech and Sig. Proc., 27, 1979. pp. 113-120. In this method the frequency domain filter coefficients are calculated from $$F(k, m) = \frac{\max(|X(k, m)|^2 - R_n(k, m), 0)}{|X(k, m)|^2}$$

where F(k,m) represents the filter gain at frequency k and time m, X(k,m) is spectrum of the noisy speech signal and Rn(k, m) is the estimated noise power at time m and frequency k.

The spectral subtraction, although a simple method, suffers from an annoying artifact at output signal known as musical noise. The musical noise is caused by randomly spaced spectral peaks that come and go in each frame of data and occur at random frequencies.

Several methods have been proposed that reduce musical noise artifacts at the expense of introducing speech distortion. Minimum mean square error short time spectral estimator proposed by Y. Ephraim and D. Malah, "Speech enhancement using a minimum mean-square error short-time spectral amplitude estimator," IEEE Trans. Acoust., Speech, Signal Processing, vol. ASSP-32, pp 1109-1121, 1984, is a known noise reduction method that does not have the musical noise artifact but it is computationally expensive to implement and the trade-off between noise reduction and distortion in output speech is poor.

In general most of the existing noise methods are either computationally very expensive or they have poor output quality especially for low signal to noise ratio.

SUMMARY OF INVENTION

The present invention provides an enhanced version of the spectral subtraction method with very low computational complexity (less than 3.5 MIPs) and very high performance (more than 20 dB of suppression for car noise) with good subjective quality.

According to the present invention there is provided a method of reducing noise in a speech signal comprising converting the speech signal to the frequency domain using a fast fourier transform (FFT); creating a subset of selected spectral subbands; determining the appropriate gain for each subband; interpolating the gains to match the number of FFT points; and applying the interpolated gains as filter coefficients to the converted speech signal; and performing an inverse FFT to recover a time domain output signal.

The invention can be used for speech enhancement in any voice communication systems where the speech signals are contaminated with high back ground noise. Examples are hands free communication inside a moving car or teleconferencing when talking through a speakerphone in a noisy environment. The main advantages of the proposed invention, compared with the prior art, are its high performance (maximizing noise suppression while minimizing speech distortion) even under severe noisy conditions and very low computational complexity.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

In the first stage of the process, the noisy speech signals are pre-processed to remove the low frequency artifacts. In the next stage the pre-processed signals are converted to frequency domain using an FFT block. Based on the outputs signal powers of the FFT block, 16 spectral subbands are created.

The average power at each subband is calculated and based on that, a noise-activity detector will detect portions of the signal that are mainly dominated by the noise. The output of the noise activity detector is used for updating noise power estimate. The ratio between the noise power and the signal power are used as an input to a look-up-table which calculates the appropriate gain for each subband and each data frame.

Those subbands that have a low signal-to-noise ratio will have calculated gains that are close to zero while for high signal-to-noise ratios, the calculated gains will be close to one. The gains calculated for all 16 subbands will be interpolated to match the number of input FFT points. The interpolation gains then are multiplied by the output of the FFT block. The outcome of this then is converted back to time domain using an inverse FFT where after some post-processing, a clean speech signal will be reproduced.

Figure 1:
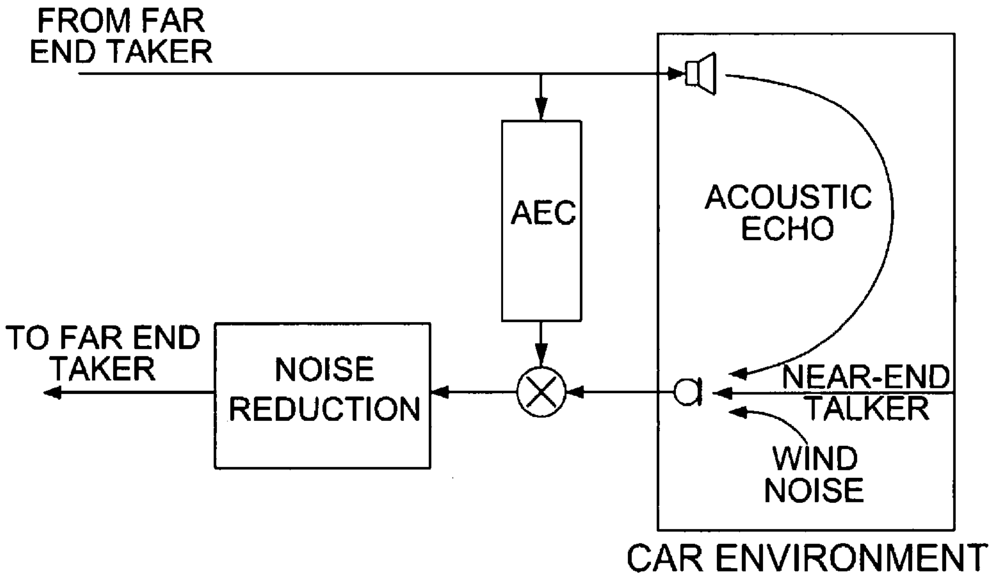
FIG. 1 shows the application of noise reduction in hands free car communication.
Figure 2:
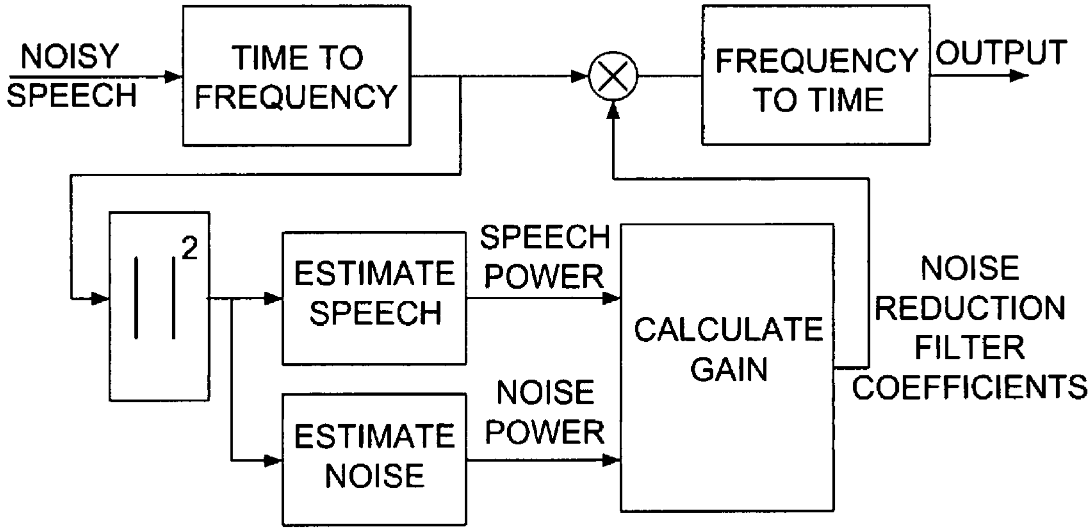
FIG. 2 shows the block diagram of a general spectral domain noise reduction method.
Figure 3:
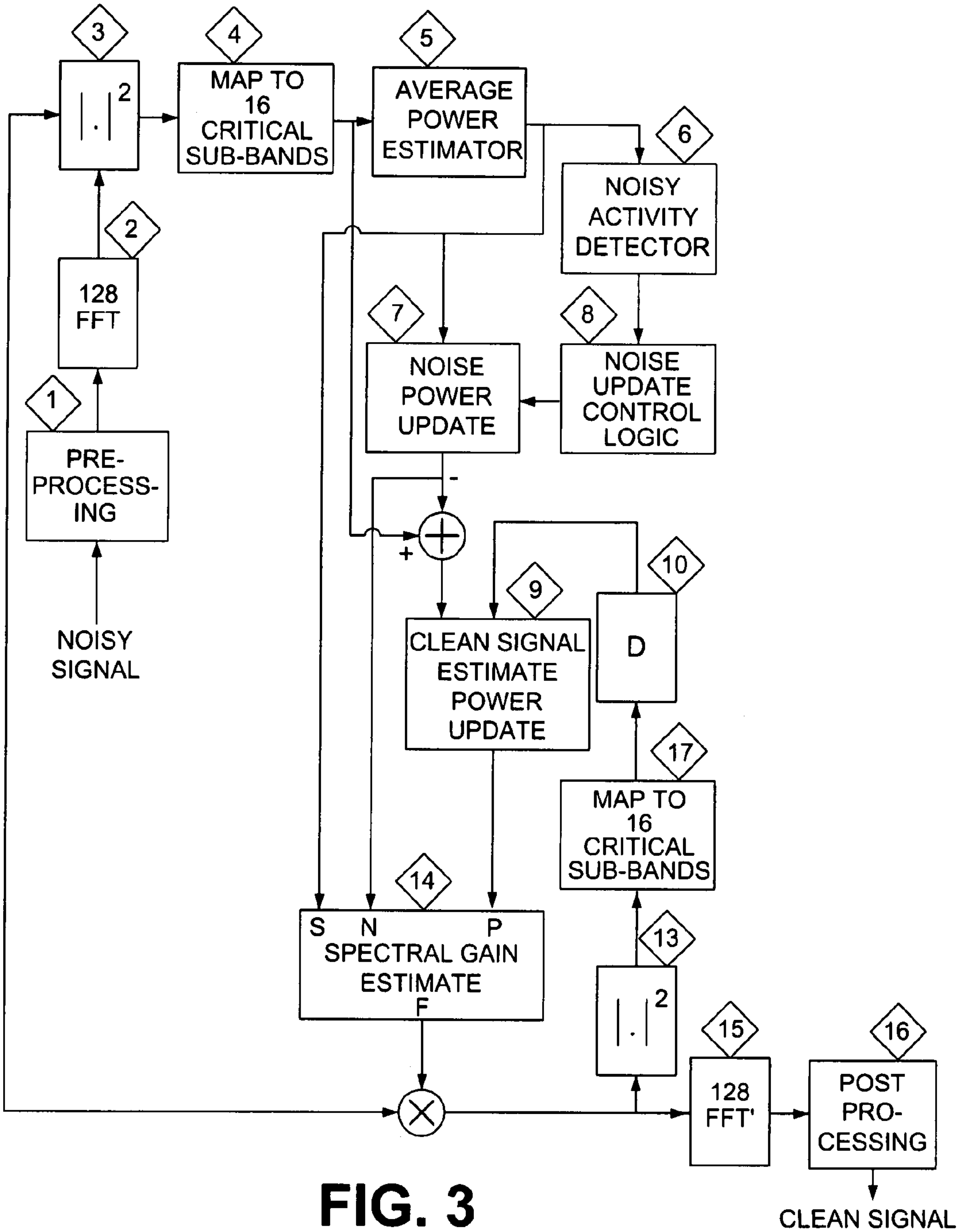
FIG. 3 shows the proposed Noise Reduction Block Diagram.

FIG. 3 shows the block diagram illustrating the proposed noise reduction method. The noisy speech signal first is passed through a pre-processing stage 1 which consists of a high-pass filter, a 128-sample framer and a windowing function. A 128 point FFT 2 is applied to each frame of data and at the output of the FFT block the power 3 of each frequency bin is calculated. Since the input signal is real, only half of the FFT frequency bins are required for the calculations.

Using block 4 FFT power signals are mapped to 16 critical subbands by simply adding the power of the corresponding frequency bins in each subband. The time averaged power at each subband then is calculated using block 5. Noise activity detector 6 detects those regions in input signal spectrum which are dominated by noise. The noise update control logic 8 determines noise power estimate 7 updating periods. An estimate of clean speech signal power is made using module 9 based on a first order autoregressive AR estimator given by $$P(k,m)=\beta\tilde{P}(k,m-1)+(1-\beta)\max(Rx(k,m)-Rn(k,m),0)$$

where Rxk, m is the output of module 4 for subband k and time m, Rnk,m is the output of module 7, P(k,m−1) is the previously calculated clean speech spectral power which is obtained using modules 10, 13 and 17 and $0<\beta<1$ is the update factor.

Figure 6:
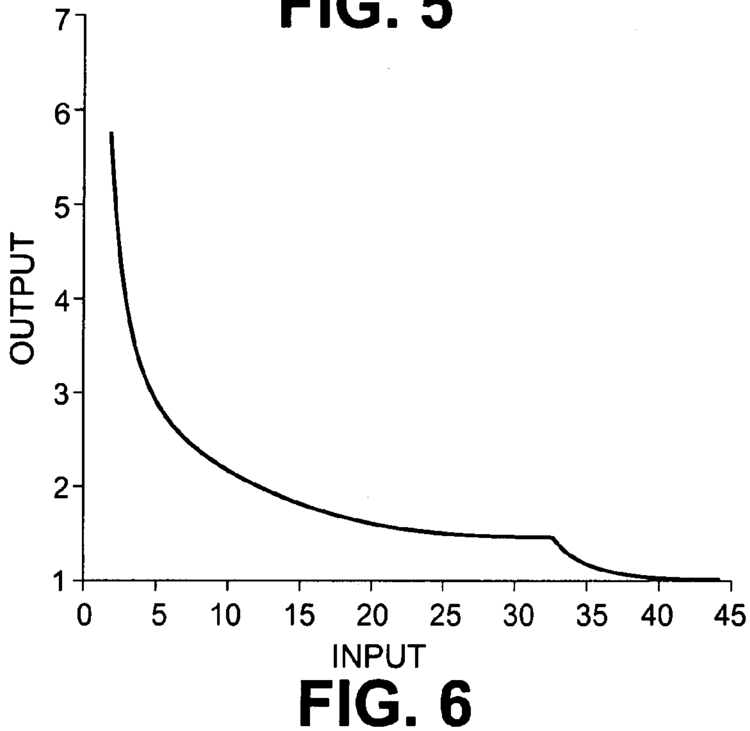
FIG. 6 shows input, output relationship for the noise reduction look-up-table.

The final noise reduction filter coefficients are calculated using module 14 and based on the outputs from modules 5, 7 and 9. The heart of this module 14 is a 43-entry lookup table with an input-output relationship shown in FIG. 6. The filter coefficients are multiplied by the outputs from 2 and after taking the inverse FFT 15 and post processing 16 the clean speech signal will be available at output of module 16.

Figure 4:
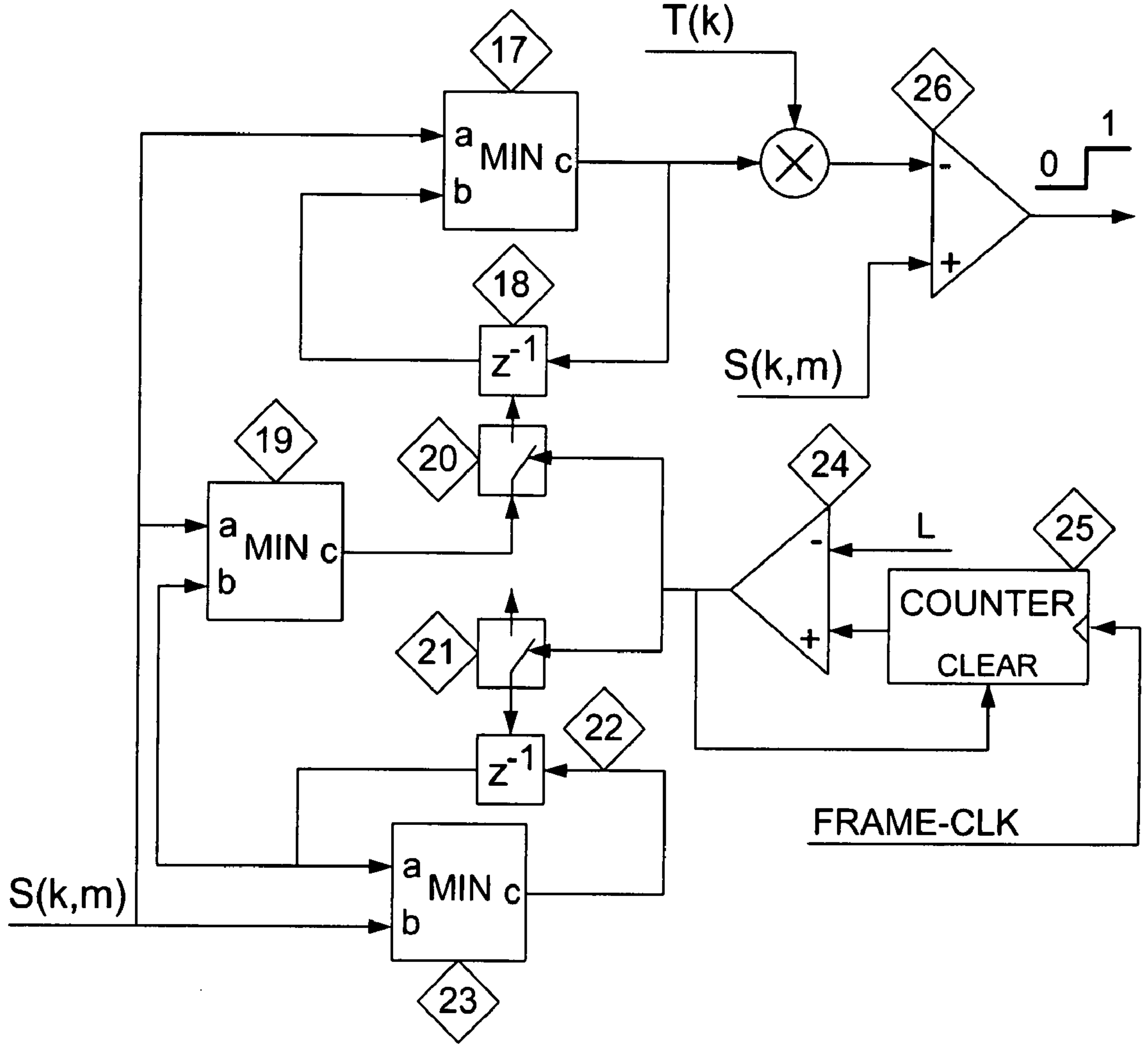
FIG. 4 is the noise activity detector implementation diagram.
Figure 5:
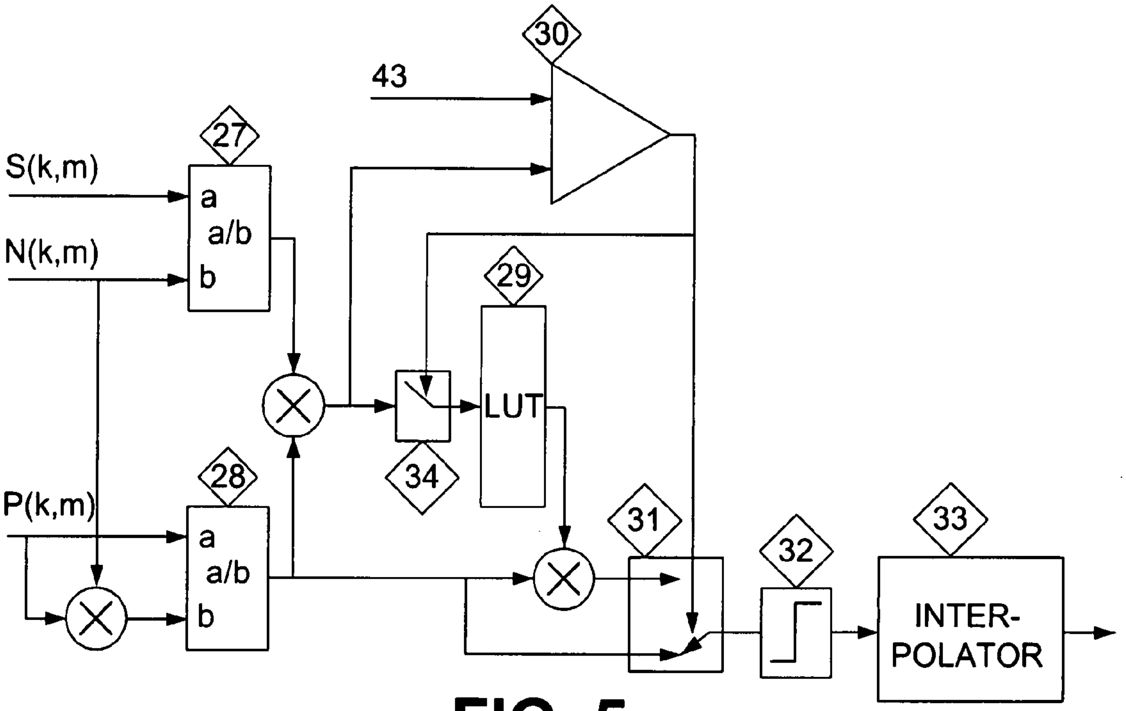
FIG. 5 is spectral gain estimator implementation diagram.

The noise activity detector shown in more detail in FIG. 4 detects those data frames in each subband where only noise is present and speech power is negligible. The output of the noise activity detector is used for estimating the power of the noise in modules 7 and 8.

Since the noise activity detector is required for every subband, in this embodiment a total of 16 noise activity detectors, with the implementation shown in FIG. 4, are required.

The input to the noise activity detector is the averaged power estimate output of module 5 in FIG. 3 where for subband k and data frame m is shown by S(k,m). The output of the noise activity detector is either zero or one with one indicating the presence of the noise in data frame m and subband k. T(k) is the noise coefficients' value used at subband k and has direct relationship with the probability of presence of speech in that subband. Since for speech signals most of the power is concentrated in lower frequency bands the probability of speech presence in low frequency subbands is higher and so a higher value of T is used. For higher frequency subbands a lower value for T is used since the probability of speech presence in those subbands is low. The memory modules 18 and 22 contain the past output values of 17 and 23 and after every L data frames their values, respectively, are re-initialized to the output value of 19 and current input Sk,m. In FIG. 4, the outputs of the modules 17, 19 and 23 are given by $$c=\begin{cases} a & a\leq b \\ b & b<a \end{cases}$$

which is basically the minimum of the two input values a and b. Counter 25 counts number of data frames. When L data frames have been counted the counter 25 and blocks 23, 17 and 19 will be re-initialized.

The spectral gain estimator calculates the noise reduction filter coefficients based on the estimated noise power (N(k, m)), estimated clean speech signal power P(k,m) and noise speech power S(k,m) for spectral subband k and data frame m. Block 28 calculates the ratio between estimated clean speech power and total power for subband k and data frame m. When the noise power is low, this ratio is close to one while for high noise power this value is close to zero. Module 27 computes the ratio between the noisy speech signal power and the estimated noise power. For low noise condition this ratio is a large number while for highly noisy environment this ratio is close to one. The product of the outputs of 27 and 28 is used as the inputs to a 43-entry lookup table 29. Comparator 30 will detect if the input to the 29 is greater than 43 and it will open the switch 34 and the output of the switch 31 will be connected directly to the output of 28. Note that for data frames and spectral subbands where the noise power is low, the output product of 27 and 28 will be a large number possibly greater than 43 and so the output of the spectral gain estimator will be basically the output of 28 which for low noise conditions will be close to one. In other words for those data frames and spectral subband the input signal will not be affected. On the other hand for high noise levels the output product of 27 and 28 will be a small number possibly less than 43 which in this case the output of 31 is determined by the product of the outputs of 29 and 28. The output of the 29 is determined by the nonlinear function shown in FIG. 6.

To make sure the output of 31 does not go beyond one, block 32 saturates the output of 31 from above to one. Also to reduce the speech signal distortion, block 32 will limit the output of 31 from below to some programmable small positive number. For each subband block 33 will interpolate the output 32 to the number of frequency bins in that subband. The interpolation is done by repeating the same value for every frequency bin in the subband.

In the described embodiment, the same lookup table 29 is used for all 16 subbands. In an alternative embodiment a different lookup table for each subband can be used. This allows for tailoring the contents of the lookup table for each subband appropriately to improve the trade-off between speech distortion and amount of noise reduction.

The interpolation stage block 33 can be done using a cross subband linear or non-linear interpolation to improve the quality of the output speech.

Embodiments of the invention provide high performance for low computational complexity, a noise activity detector that is simple to implement, and a simple method for calculating filter gains which eliminate the musical tone problem.

The invention claimed is:

1. A method of reducing noise in a speech signal comprising:

converting the speech signal to the frequency domain using a fast fourier transform (FFT);

creating a subset of selected spectral subbands;

computing, in each subband, the estimated clean speech signal power using a first order autoregressive estimator, the estimated noise power, and the estimated noise speech power;

computing a first ratio between the estimated clean speech signal power and the sum of the noise speech power and the clean speech signal power;

computing a second ratio between the noise speech power and the estimated noise power;

computing the product of the first and second ratios;

applying said product as an input to a lookup table to determine the appropriate gain for each subband;

interpolating the gains to match the number of FFT points;

applying the interpolated gains as filter coefficients to the converted speech signal; and performing an inverse FFT to recover a time domain output signal.

2. A method as claimed as claimed in claim 1, wherein one said lookup table is provided for each subband.

3. A method as claimed in claim 1, wherein the speech signal is pre-processed prior to being converted to the frequency domain to remove low frequency artifacts.

4. A method as claimed in claim 1, wherein the estimated noise power in each subband is determined from the estimated power in each subband.

5. A method as claimed in claim 1, further detecting noise activity in each subband to detect subbands where speech power is negligible and using the output of the noise activity detector to estimate the noise power in each subband.

6. A method as claimed in claim 5, wherein the noise activity is determined from the noise speech power in a particular subband multiplied by a coefficient that depends on the probability of the presence of speech in that subband.

* * * * *